Jan. 26, 1971   H. LIMMER   3,557,517
METHOD FOR THE CONTINUOUS PRODUCTION OF EVACUATED PACKAGES
AND APPARATUS FOR THE PERFORMANCE OF THE AFORESAID METHOD
Filed Feb. 20, 1969   2 Sheets-Sheet 2

INVENTOR,
HERBERT LIMMER
BY Jacobi & Davidson
ATTORNEYS

United States Patent Office 3,557,517
Patented Jan. 26, 1971

3,557,517
METHOD FOR THE CONTINUOUS PRODUCTION OF EVACUATED PACKAGES AND APPARATUS FOR THE PERFORMANCE OF THE AFORESAID METHOD
Herbert Limmer, Munich, Germany, assignor to Tourpac AG, Zug, Switzerland, a corporation of Switzerland
Filed Feb. 20, 1969, Ser. No. 801,039
Claims priority, application Switzerland, Feb. 29, 1968, 2,981/68
Int. Cl. B65b *31/00*
U.S. Cl. 53—22
8 Claims

ABSTRACT OF THE DISCLOSURE

There is disclosed a method and apparatus for the continuous evacuation and sealing of successive individual filled packages wherein two foil webs defining an upper foil web and a lower foil web are fed along a predetermined path of travel. The lower foil web is filled at predetermined spaced locations along its length with the material to be packaged. The lower filled foil web and the upper foil web are conducted past a respective one of two wall means of a vacuum chamber, said respective wall means being provided with openings and abutting one another along an edge. A vacuum is created in the vacuum chamber, to thereby press the foil webs against their associated wall means and by means of said edge said foil webs are pressed against one another. Thereafter the foil webs are sealed together along their lengthwise extending edges and in a direction transverse thereto along a strip portion thereof. Finally, the finished sealed package is separated from the next successive package substantially at the central region of the adjoining strip portion.

BACKGROUND OF THE INVENTION

The present invention relates to an improved method for the continuous production of evacuated packages as well as to an improved apparatus for the performance of the aforesaid method.

A number of different methods or techniques have become known to the art by means of which deep-drawn packages are continuously fabricated from webs of formable and heat-sealable foils and foil combinations through application of vacuum forming. In accordance with these prior art techniques, the material to be packaged is introduced between a formed lower carrier foil and a cover foil which is applied after the filling operation. In the prior art technique under consideration, generally the package is hermetically sealed by carrying out two sealing operations which are spaced in time from one another and interrupted by the evacuation procedure. Separation or severing of the filled individual packages from the foil web occurs in conventional manner. However, all of the known methods possess the notable drawback that the evacuation operation and the sealing operation, in each instance, must occur in succession. Apart from the fact that such operating technique requires a considerable expenditure for the equipment as well as the electrical control, additionally, the operational efficiency or capacity of such type apparatuses are considerably reduced.

SUMMARY OF THE INVENTION

Accordingly, it is a primary object of the present invention to provide an improved method and apparatus which effectively overcomes the aforementioned drawbacks experienced in the prior art during the fabrication of such vacuum packages.

Another, more specific object of the present invention relates to an improved method and apparatus for the production of evacuated or vacuum packages wherein evacuation can be carried out without resorting to the previously employed spreading devices for holding apart the package foils in order to remove the air.

Still a further significant object of the present invention relates to an improved method of, and apparatus for, the production of evacuated packages in an extremely efficient, reliable and inexpensive manner, resulting in improved economies during the manufacturing operation and increased production.

Now, in order to implement these and still further objects of the invention, which will become more readily apparent as the description proceeds, the inventive method contemplates that the lower web which is filled at predetermined spaced locations with material to be packaged and the second upper web are conducted past a respective wall of a vacuum chamber, such respective walls being provided with openings and abutting or meeting one another along an edge. Due to the vacuum or negative pressure prevailing in the vacuum chamber or compartment, these webs are pressed against such wall surfaces and along the aforementioned edge the webs run together and are pressed together. Thereafter, both of the webs are sealed with one another along their lengthwise extending edges and in a direction transverse thereto along a strip portion thereof. Then the finished sealed package is separated from the next successive package substantially at the center of the transverse extending strip portion.

The inventive apparatus for carrying out the previously described inventive method incorporates a vacuum chamber which extends substantially transverse to the lengthwise direction of the foil webs. This vacuum chamber is provided with openings at two guide surfaces which abut or adjoin along an edge. Each respective one of the guide surfaces is destined to cooperate with one of the foil webs. Additionally, there is provided a device for sealing both of the webs with one another along their lengthwise edges and along a transverse extending strip portion.

BRIEF DESCRIPTION OF THE DRAWINGS

The invention will be better understood, and objects other than those set forth above, will become apparent, when consideration is given to the following detailed description thereof. Such description makes reference to the annexed drawings wherein.

DESCRIPTION OF THE PREFERRED EMBODIMENTS

Figure 3:
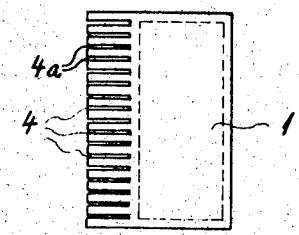

Describing now the drawings, it will be recognized that the exemplary embodiments of inventive apparatus illustrated herein each incorporate a vacuum chamber or compartment 1, best shown in FIG. 3, wherein two of its guide wall surfaces 2 and 3 which meet or abut along an edge 3a are provided with suitable openings 4a. These openings 4a, as best observed by referring to FIG. 3, are defined by finger-like slits 4 which extend in substantial parallelism with one another. Instead of using these slits 4, it would be also possible to employ bores or other suitable apertures to define such openings 4a. At this juncture, it is also mentioned that throughout the various embodiments herein disclosed, the same reference numerals have been employed for the same or analogous components.

Continuing, it will be recognized that the vacuum chamber 1 extends substantially transverse to the lengthwise direction of the foil webs 5 and 6 from which the packages are fabricated. These foil webs consist of flexible, generally transparent, heat-sealable plastic which is nowadays used for packaging purposes and well known to those versed in this particular art.

The foil webs 5 and 6 are payed-off from packages or coils 7 and 8, respectively. The lower situated foil web 5 is heated up by a suitable heating member 9 on its way to the vacuum chamber 1, so that it becomes plastically deformable and due to the action of the vacuum or negative pressure prevailing in such vacuum chamber is sucked into depressions or recesses 10 of molds 11. Due to such, bulges or recessed portions 5a are formed at spaced locations along the foil web 5 which serve to receive the material to be filled.

Figure 1:
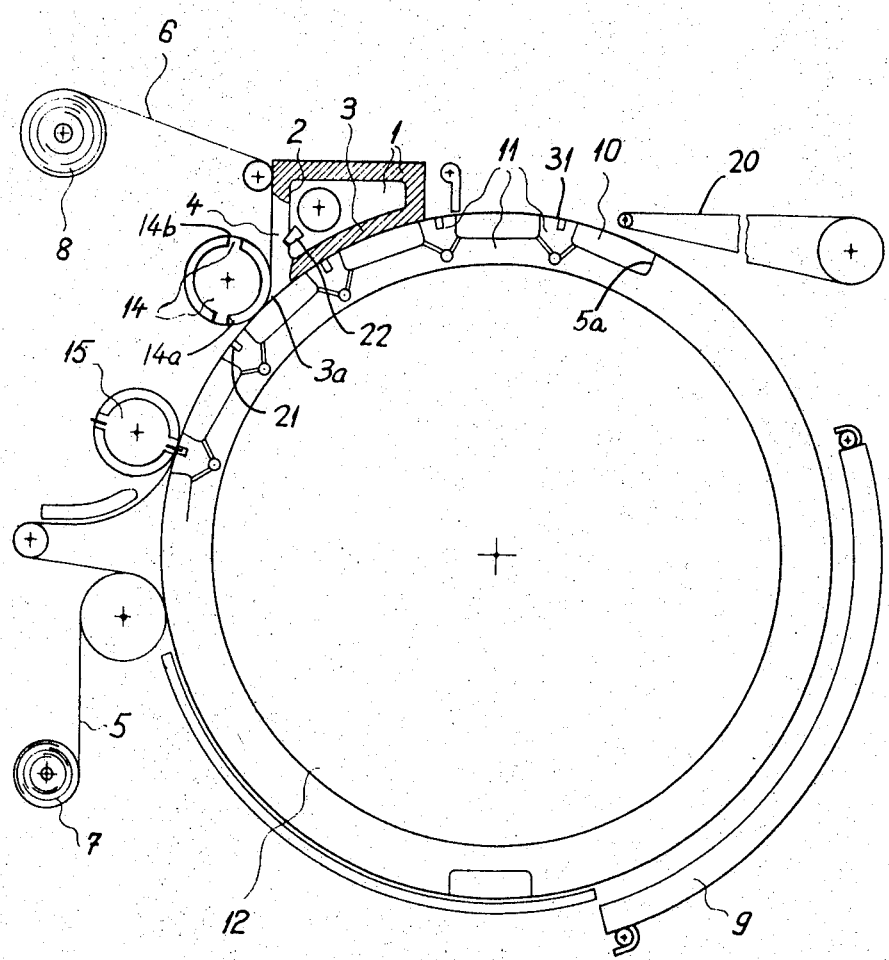
FIG. 1 is a schematic side view of a first embodiment of inventive packaging apparatus.
Figure 2:
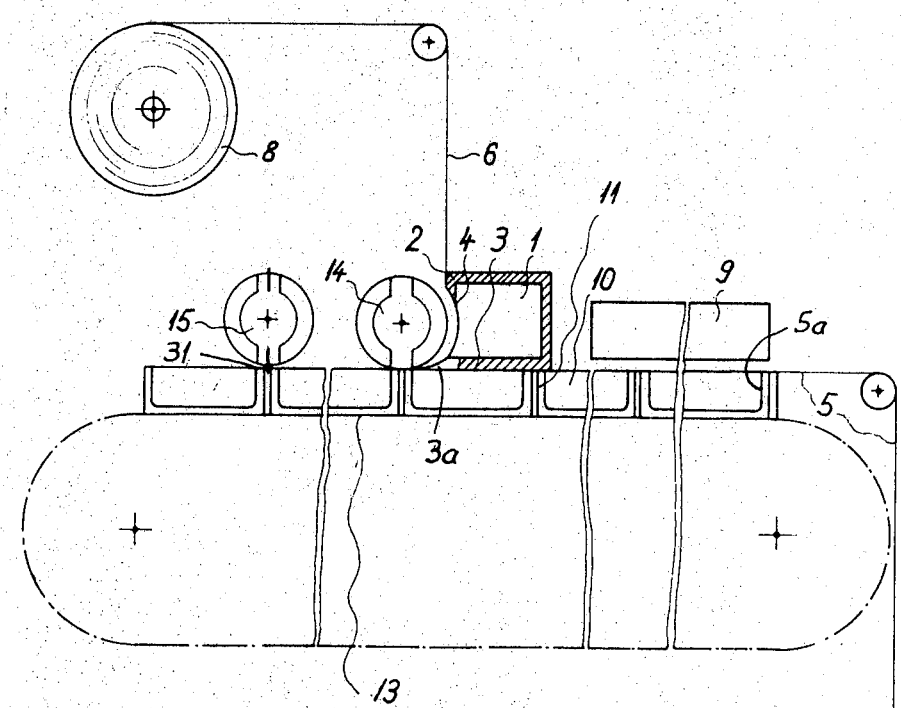
FIG. 2 is a schematic side view of a second embodiment of inventive packaging apparatus; and, FIG. 3 is an enlarged detailed view of a portion of the vacuum chamber appearing in the embodiments of apparatus depicted in FIGS. 1 and 2 as viewed from the top.

In the embodiment depicted in FIG. 1, the molds 11 are provided at the periphery of a drum member 12 and, in the variant construction of FIG. 2, such molds 11 are provided at an endless conveyor band member 13. In fact, these molds 11 can be separate members mounted at the drum member 12 or endless conveyor band 13 or can be hollowed out from the body of the drum member 12 or such conveyor band 13.

Upon referring to FIG. 1, it will be understood that the web of material 5 thusly provided with the bulged or recessed portions 5a travels towards the vacuum chamber 1, whereby at a suitable location between the heating body member 9 and this vacuum chamber 1 the material to be filled is introduced into these bulged or recessed portions 5a, for instance by means of a suitable schematically illustrated filling device 20 shown in FIG. 1. Due to the vacuum produced in the vacuum chamber 1, for instance by using a non-illustrated conventional suction pump, the web of material 5 is sucked against the guide wall surface 3 and tightly closes the associated openings 4a of the fingerlike slits 4. On the other hand, the foil web 6 travels past the guide wall surface 2 of the vacuum chamber 1 and by virtue of the existence of the vacuum or negative pressure this web 6 is sucked by means of the openings 4a of the associated finger-like slits 4 in sealing fashion against the associated guide wall surface 3.

At the location where the guide wall surfaces 2 and 3 meet or join along an edge 3a, the foil webs 5 and 6 are pressed and held against one another due to the action of the vacuum or negative pressure. Moreover, just in front of this edge 3a, the lengthwise edges of the foil webs 5 and 6 are sealed with one another by means of a suitable heating roller 14 or equivalent structure. This heating roller 14 extends in a direction transverse to the direction of travel of the webs 5 and 6. At its end, it possesses heating surfaces 14a which extend in the peripheral direction and such heating roller 14 further possesses strip-shaped heating surfaces 14b which extend in the axial direction of such roller and bring about a sealing of the webs 5 and 6 along a transverse extending strip portion 21, so that the individual packages containing the material are tightly sealed.

Furthermore, it will be understood that a knife roller 15 or equivalent structure cuts or severs the webs 5 and 6 in the transverse direction between the successive sealed packages, and specifically, at the central region of the transverse extending sealed portion 21.

Additionally, it would be possible to provide in the vacuum chamber or compartment 1, at the region of the edge portions 3a between the guide wall surfaces 2 and 3, suitable nozzles 22 (FIG. 1) for introducing an inert gas into the interior of each of the packages, whereby at the same time there results a reduction of the vacuum prevailing in the package.

And essential aspect of the method which can be performed with the heretofore described embodiments of inventive apparatus resides in the fact that the evacuation of the packages and their sealing takes place continuously and without interruption between evacuation and closure of the package.

It is here also mentioned that the edges 31 adjacent and between the depressions or recessed portions 10 of the molds 11 serve as support means for the edges of the bulged portions 5a provided at the foil web 5 and as counter-support during sealing of the webs 5, 6 beneath the heating roller 14. Also, it might be remarked that the dimensions of the marginal portions or edges 31 surrounding the depressions 10 correspond to those of the sealing locations of the packages which are to be fabricated.

It should be apparent from the foregoing detailed description, that the objects set forth at the outset to the specification have been successfully achieved. Accordingly,

What is claimed is:

1. An apparatus for the continuous evacuation and sealing of successive individual filled packages formed of at least two foil webs, comprising vacuum chamber means extending substantially transverse to the lengthwise direction of said foil webs, said vacuum chamber means including two guide surfaces meeting along an edge and provided with openings, each of said guide surfaces cooperating with one of said foil webs, drum means positioned for cooperation with said vacuum chamber means and provided with spaced depressions for receiving bulged portions provided at the lower one of said foil webs for the material to be filled, said vacuum chamber means extending substantially transverse to the periphery of said drum means, the marginal portions of said drum means surrounding said spaced depressions substantially corresponding in their dimensions to those of the sealing locations of the package to be produced, and means for sealing together both foil webs with one another along their lengthwise edges and along a strip portion extending transverse to said lengthwise edges.

2. An apparatus for the continuous evacuation and sealing of successive individual filled packages formed of at least two foil webs, comprising vacuum chamber means extending substantially transverse to the lengthwise direction of said foil webs, said vacuum chamber means including two guide surfaces meeting along an edge and provided with openings, each of said guide surfaces cooperating with one of said foil webs, an endless conveyor means positioned for cooperation with said vacuum chamber means and provided with spaced depressions for receiving bulged portions for the material to be filled provided at the lower one of said foil webs, the marginal portions surrounding said spaced depressions of said endless conveyor means being constructed as a support for the edges of said bulged portions provided at the lower foil web and as counter-support for said sealing means, and means for sealing together both foil webs with one another along their lengthwise edges and along a strip portion extending transverse to said lengthwise edges.

3. An apparatus for the continuous evacuation and sealing of successive individual filled packages formed of at least two foil webs, comprising vacuum chamber means extending substantially transverse to the lengthwise direction of said foil webs, said vacuum chamber means including two guide surfaces meeting along an edge and provided with openings, each of said guide surface cooperating with one of said foil webs to support said foil webs against the pressure of the ambient air, means cooperating with said vacuum chamber means for guiding said two foil webs along a predetermined path of travel continuously past said two guide surfaces of said vacuum chamber means and into contact with one another at the region of said edge of said two guide surfaces, and means located after said vacuum chamber means with respect to said predetermined path of travel of said foil webs for sealing together both said foil webs with one another along their lengthwise edges and along a strip portion extending transverse to said lengthwise edges.

4. An apparatus as defined in claim 3, wherein said means cooperating with said vacuum chamber means for guiding said two foil webs along a predetermined path of travel incorporates drum means.

5. An apparatus as defined in claim 3, wherein said means cooperating with said vacuum chamber means for guiding said two foil webs along a predetermined path of travel incorporates endless conveyor means.

6. An apparatus as defined in claim 3, further including nozzle means provided at said vacuum chamber means at the region of said meeting guide surfaces provided with said openings, said nozzle means serving for gasification with reduction in pressure of the vaccum of the space between said foil webs contacting one another at the region of said edge of said two guide surfaces.

7. A method for the continuous evacuation and sealing of successive individual filled packages sealed completely about their periphery and formed of two foil webs, comprising the steps of feeding at least two foil webs along a predetermined path of travel, three-dimensionally-preforming at least one of said foil webs, filling said one foil web at spaced locations along its length with the material to be packaged, continuously guiding said one filled foil web and the other foil web in a direction towards one another past a respective one of two supporting wall means of a vacuum chamber, generating a vacuum in the vacuum chamber, continuously pressing by means of such vacuum the foil webs against their associated supporting wall means, to thus support said foil webs against the pressure of the surrounding ambient air, then causing said foil webs to contact one another, utilizing the pressure differential existing between the ambient air and the vacuum prevailing between said foil webs to firmly press said foil webs against one another, thereafter sealing together said foil webs along their lengthwise extending edges and in a direction transverse thereto along a strip portion thereof, and separating the finished sealed package from the next successive package.

8. The method defined in claim 7, further including the steps of introducing a gas between said foil webs as they are being continuously guided towards one another while maintaining a vacuum between said foil webs.

References Cited

UNITED STATES PATENTS

| | | | |
|---|---|---|---|
| 2,633,684 | 4/1953 | Rohdin | 53—112 |
| 2,840,961 | 7/1958 | Karpowicz | 53—112X |
| 3,061,984 | 11/1962 | Mahaffy | 53—22 |

TRAVIS S. McGEHEE, Primary Examiner

U.S. Cl. X.R.

53—112